US009818221B2

(12) United States Patent
Obert

(10) Patent No.: US 9,818,221 B2
(45) Date of Patent: Nov. 14, 2017

(54) START NODE DETERMINATION FOR TREE TRAVERSAL FOR SHADOW RAYS IN GRAPHICS PROCESSING

(71) Applicant: QUALCOMM Incorporated, San Diego, CA (US)

(72) Inventor: Juraj Obert, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/053,930

(22) Filed: Feb. 25, 2016

(65) Prior Publication Data

US 2017/0249779 A1    Aug. 31, 2017

(51) Int. Cl.
G06T 15/00     (2011.01)
G06T 15/80     (2011.01)
G06T 15/06     (2011.01)

(52) U.S. Cl.
CPC .............. *G06T 15/80* (2013.01); *G06T 15/06* (2013.01)

(58) Field of Classification Search
CPC ....... G06T 15/005; G06T 15/06; G06T 15/80; G06T 15/04; G06T 2200/28
USPC .................................................. 345/426, 419
See application file for complete search history.

(56) References Cited

U.S. PATENT DOCUMENTS

| 7,002,571 B2 | 2/2006 | Lake et al. |
| 7,340,711 B2 * | 3/2008 | Hetzel ................. G06F 17/5077 716/130 |
| 8,212,816 B1 * | 7/2012 | Hoberock ............... G06T 15/06 345/426 |
| 8,253,730 B1 | 8/2012 | Carr |
| 8,502,819 B1 | 8/2013 | Aila et al. |
| 8,638,331 B1 | 1/2014 | Jarosz et al. |
| 8,717,357 B2 * | 5/2014 | McCombe .............. G06T 15/06 345/419 |

(Continued)

FOREIGN PATENT DOCUMENTS

EP    2950275 A1    12/2015
NO    2008012199 A2    1/2008

OTHER PUBLICATIONS

J Hurley, A. Kapustin, A. Reshetov, and A. Soupikov. Fast ray tracing for modern general purpose CPU. In Proceedings of GraphiCon 2002, 2002.*

(Continued)

*Primary Examiner* — Phu K Nguyen
(74) *Attorney, Agent, or Firm* — Shumaker & Sieffert, P.A.

(57) ABSTRACT

At least one processor may organize a plurality of primitives of a scene in a hierarchical data structure, wherein a plurality of bounding volumes are associated with a plurality of nodes of the hierarchical data structure. The at least one processor may rasterize a representation of each of the plurality of bounding volumes to an off-screen render target in the memory. The at least one processor may determine, based at least in part on a pixel in the off-screen render target that maps to a ray in the scene, a non-root node of the hierarchical data structure associated with the pixel as a start node to start traversal of the hierarchical data structure. The at least one processor may traverse the hierarchical data structure starting from the start node to determine whether the ray in the scene intersects one of the plurality of primitives.

30 Claims, 6 Drawing Sheets

(56) References Cited

U.S. PATENT DOCUMENTS

| | | | |
|---|---|---|---|
| 8,791,945 B2* | 7/2014 | Clarberg | G06T 15/00 |
| | | | 345/419 |
| 9,424,685 B2* | 8/2016 | Howson | G06T 15/80 |
| 2005/0243346 A1 | 11/2005 | Foehr et al. | |
| 2006/0256112 A1 | 11/2006 | Heirich et al. | |
| 2008/0024489 A1 | 1/2008 | Shearer | |
| 2008/0259075 A1 | 10/2008 | Fowler et al. | |
| 2009/0189898 A1 | 7/2009 | Dammertz et al. | |
| 2009/0256845 A1 | 10/2009 | Sevastianov et al. | |
| 2009/0262132 A1 | 10/2009 | Peterson et al. | |
| 2010/0053162 A1 | 3/2010 | Dammertz et al. | |
| 2010/0079455 A1 | 4/2010 | Wei et al. | |
| 2010/0079457 A1 | 4/2010 | Tavenrath | |
| 2010/0289799 A1 | 11/2010 | Hanika et al. | |
| 2011/0316855 A1 | 12/2011 | Mejdrich et al. | |
| 2012/0182300 A1 | 7/2012 | Salvi et al. | |
| 2013/0207967 A1 | 8/2013 | Park et al. | |
| 2013/0215436 A1 | 8/2013 | Genda | |
| 2014/0285488 A1 | 9/2014 | Sevastiyanov et al. | |
| 2015/0193968 A1 | 7/2015 | Barringer et al. | |
| 2015/0302629 A1 | 10/2015 | Obert et al. | |

OTHER PUBLICATIONS

Bak, "Real Time Ray Tracing," Master thesis, IMM, DTU, Project No. 38, Jun. 2010, 105 pp.
International Search Report and Written Opinion—PCT/US2017/012130—ISA/EPO—Mar. 21, 2017.
Knoll A., et al., "Interactive Isosurface Ray Tracing of Large Octree Volumes," IEEE Symposium on Interactive Ray Tracing, 2006, 9 pages.
Wald I., et al., "State of the Art in Ray Tracing Animated Scenes," Euro graphics Technical Report Series, Sep. 1, 2007, pp. 89-116, XP007908773.
Reshetov A., et al., "Multi-Level Ray Tracing Algorithm", ACM Transactions on Graphics (TOG), ACM, US, vol. 24, No. 3, Jul. 1, 2005 (Jul. 1, 2005), pp. 1176-1185, XP002466403, ISSN: 0730-0301, DOI: 10.1145/1073204.1073329.

* cited by examiner

START NODE DETERMINATION FOR TREE TRAVERSAL FOR SHADOW RAYS IN GRAPHICS PROCESSING

TECHNICAL FIELD

This disclosure relates to graphics processing, including traversing a hierarchical data structure to determine a ray-primitive intersection for shadow ray tracing.

BACKGROUND

In computer graphics, shadow rendering is a technique in which shadows are added to a three-dimensional (3D) scene based on whether particular locations of the scene are illuminated by a light source. A graphics processing unit (GPU) may perform such shadow rendering for a particular location of the 3D scene by emanating a vector called a shadow ray from the location towards the light source. If the GPU determines that the shadow ray intersects a primitive in the scene geometry, the GPU may determine that the source location is in shadow and is not illuminated by the light source.

In order to accelerate the process of finding shadow ray-primitive intersections, the GPU may arrange the scene geometry of the 3D scene in an acceleration data structure (ADS) that hierarchically groups scene primitives (e.g., triangles). The GPU may recursively traverse the ADS by performing shadow ray intersection tests on the hierarchy of scene primitives to determine whether the shadow ray intersects a primitives of the scene. If the GPU determines that the shadow ray emanating from a particular location intersects a primitive based on the traversal of the ADS, the GPU may determine that the particular location is occluded from the light source by at least the primitive.

SUMMARY

In one aspect, the disclosure is directed to a method. The method includes organizing, by at least one processor, a plurality of primitives of a scene in a hierarchical data structure, wherein a plurality of bounding volumes are associated with a plurality of nodes of the hierarchical data structure. The method further includes rasterizing, by the at least one processor, a representation of each of the plurality of bounding volumes to an off-screen render target. The method further includes determining, by the at least one processor and based at least in part on a pixel that intersects a first ray in the off-screen render target, a non-root node of the hierarchical data structure associated with the pixel as a start node to start traversal of the hierarchical data structure. The method further includes traversing, by the at least one processor, the hierarchical data structure starting from the start node to determine whether a second ray in the scene intersects one of the plurality of primitives.

In another aspect, the disclosure is directed to an apparatus configured to process graphics data. The apparatus includes a memory. The apparatus further includes at least one processor configured to: organize a plurality of primitives of a scene in a hierarchical data structure, wherein a plurality of bounding volumes are associated with a plurality of nodes of the hierarchical data structure; rasterize a representation of each of the plurality of bounding volumes to an off-screen render target in the memory; determine, based at least in part on a pixel that intersects a first ray in the off-screen render target, a non-root node of the hierarchical data structure associated with the pixel as a start node to start traversal of the hierarchical data structure; and traverse the hierarchical data structure starting from the start node to determine whether a second ray in the scene intersects one of the plurality of primitives.

In another aspect, the disclosure is directed to an apparatus. The apparatus includes means for organizing a plurality of primitives of a scene in a hierarchical data structure, wherein a plurality of bounding volumes are associated with a plurality of nodes of the hierarchical data structure. The apparatus further includes means for rasterizing a representation of each of the plurality of bounding volumes to an off-screen render target. The apparatus further includes means for determining, based at least in part on a pixel that intersects a first ray in the off-screen render target, a non-root node of the hierarchical data structure associated with the pixel as a start node to start traversal of the hierarchical data structure. The apparatus further includes means for traversing the hierarchical data structure starting from the start node to determine whether a second ray in the scene intersects one of the plurality of primitives.

In another aspect, the disclosure is directed to a computer-readable storage medium storing instructions. The instructions, when executed, cause one or more programmable processor to: organize a plurality of primitives of a scene in a hierarchical data structure, wherein a plurality of bounding volumes are associated with a plurality of nodes of the hierarchical data structure; rasterize a representation of each of the plurality of bounding volumes to an off-screen render target in the memory; determine, based at least in part on a pixel that intersects a first ray in the off-screen render target, a non-root node of the hierarchical data structure associated with the pixel as a start node to start traversal of the hierarchical data structure; and traverse the hierarchical data structure starting from the start node to determine whether a second ray in the scene intersects one of the plurality of primitives.

The details of one or more aspects of the disclosure are set forth in the accompanying drawings and the description below. Other features, objects, and advantages of the disclosure will be apparent from the description and drawings, and from the claims.

DETAILED DESCRIPTION

In general, this disclosure describes techniques for a GPU to more efficiently perform shadow rendering for a graphics scene by determining whether shadow rays directed towards the light source of the scene intersect primitives that are arranged in a hierarchical data structure such as an ADS. Instead of traversing the hierarchical data structure from the root node, the GPU may instead start traversal of the hierarchical data structure from a node other than the root node, thereby reducing the number of ray intersection tests that the GPU may perform. The GPU may determine a non-root node of the hierarchical data structure from which to start traversal by utilizing shader units from its graphics processing pipeline to rasterize a subset of the bounding volumes associated with interior nodes and with leaf nodes of the hierarchical data structure to an off-screen render target. The GPU may determine, from the off-screen render target, an interior non-root node from which to start traversal of the hierarchical data structure, thereby reducing the number of shadow ray intersection tests a GPU may perform to traverse the hierarchical data structure. Because rasterizing to an off-screen render target is relatively less computationally expensive than performing ray intersection tests, the GPU may realize a substantial increase in shadow rendering performance by rasterizing to the off-screen render target and determining an interior non-root node from which to start traversal of the hierarchical data structure compared with traversing the hierarchical data structure from the root node.

In accordance with aspects of the present disclosure, the GPU may organize a plurality of primitives of a scene in a hierarchical data structure, wherein a plurality of bounding volumes are associated with a plurality of nodes of the hierarchical data structure. The GPU may further rasterize a representation of each of the plurality of bounding volumes to an off-screen render target in the memory. The GPU may further determine, based at least in part on a pixel that intersects a first ray in the off-screen render target, a non-root node of the hierarchical data structure associated with the pixel as a start node to start traversal of the hierarchical data structure. The GPU may further traverse the hierarchical data structure starting from the start node to determine whether a second ray in the scene intersects one of the plurality of primitives.

Figure 1:
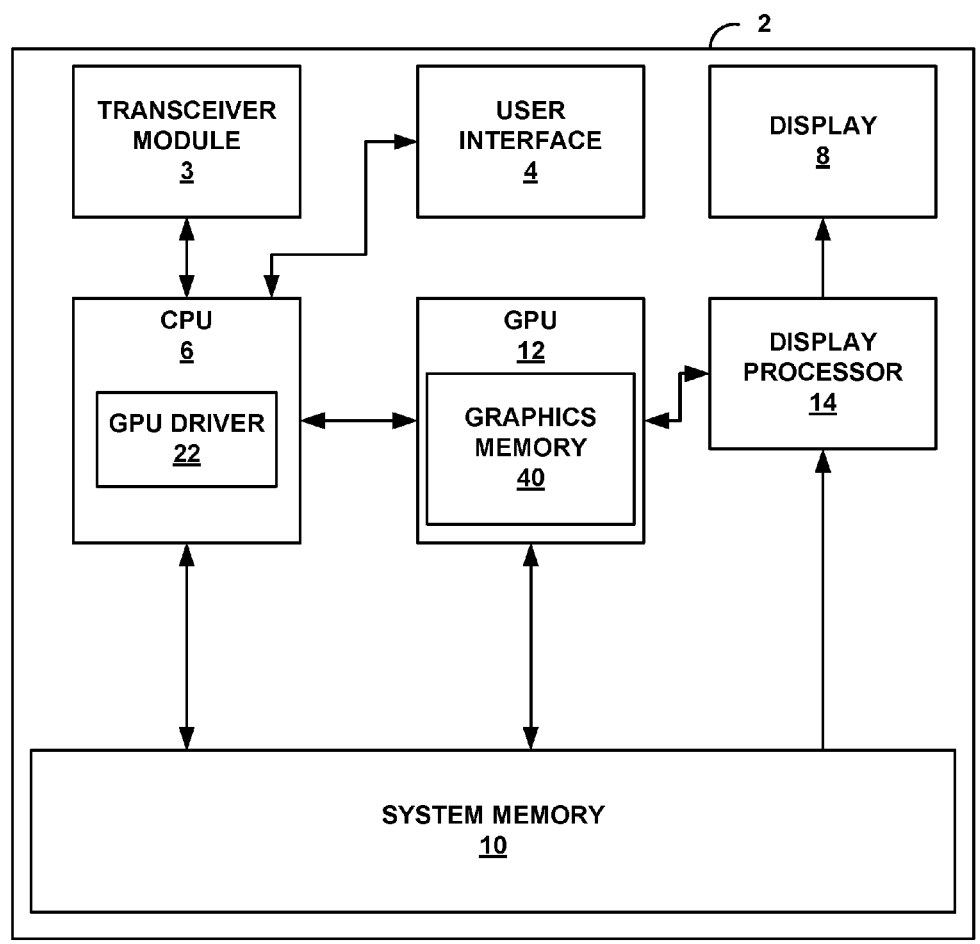
FIG. 1 is a block diagram illustrating an example computing device that may be configured to implement one or more aspects of this disclosure.

FIG. 1 is a block diagram illustrating an example computing device that may be configured to implement one or more aspects of this disclosure. As shown in FIG. 1, device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, home appliances, industrial appliances, kiosks, and the like. In the example of FIG. 1, device 2 may include central processing unit (CPU) 6, system memory 10, and GPU 12. Device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone, or a speaker where device 2 is a media player. Device 2 may also include a video camera. Furthermore, the various modules and units shown in device 2 may not be necessary in every example of device 2. For example, user interface 4 and display 8 may be external to device 2 in examples where device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of device 2. A user may provide input to device 2 to cause CPU 6 to execute one or more software applications. The software applications that execute on CPU 6 may include, for example, an operating system, a word processor application, an email application, a spreadsheet application, a media player application, a video game application, a graphical user interface application or another program. Additionally, CPU 6 may execute GPU driver 22 for controlling the operation of GPU 12. The user may provide input to device 2 via one or more input devices (not shown) such as a keyboard, a mouse, a microphone, a touch pad or another input device that is coupled to device 2 via user interface 4.

The software applications that execute on CPU 6 may include one or more graphics rendering instructions that instruct CPU 6 to cause the rendering of graphics data to display 8. In some examples, the software application instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

GPU 12 may, in some instances, be integrated into a motherboard of device 2. In other instances, GPU 12 may be present on a graphics card that is installed in a port in the motherboard of device 2 or may be otherwise incorporated within a peripheral device configured to interoperate with device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

GPU 12 may be directly coupled to graphics memory 40. Thus, GPU 12 may read data from and write data to graphics memory 40 without using a bus. In other words, GPU 12 may process data locally using a local storage, i.e., graphics memory 40, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may be the display of device 2 that displays the image content generated by GPU 12. Display 8 may be a liquid crystal display (LCD), an organic light emitting diode display (OLED), a cathode ray tube (CRT) display, a plasma display, or another type of display device.

In accordance with aspects of the present disclosure, GPU 12 may organize a plurality of primitives of a scene in a hierarchical data structure, wherein a plurality of bounding volumes are associated with a plurality of nodes of the hierarchical data structure. GPU 12 may further rasterize a representation of each of the plurality of bounding volumes to an off-screen render target in the memory. GPU 12 may further determine, based at least in part on a pixel that intersects a first ray in the off-screen render target, a non-root node of the hierarchical data structure associated with the pixel as a start node to start traversal of the hierarchical data structure. GPU 12 may further traverse the hierarchical data structure starting from the start node to determine whether a second ray in the scene intersects one of the plurality of primitives.

Figure 2:
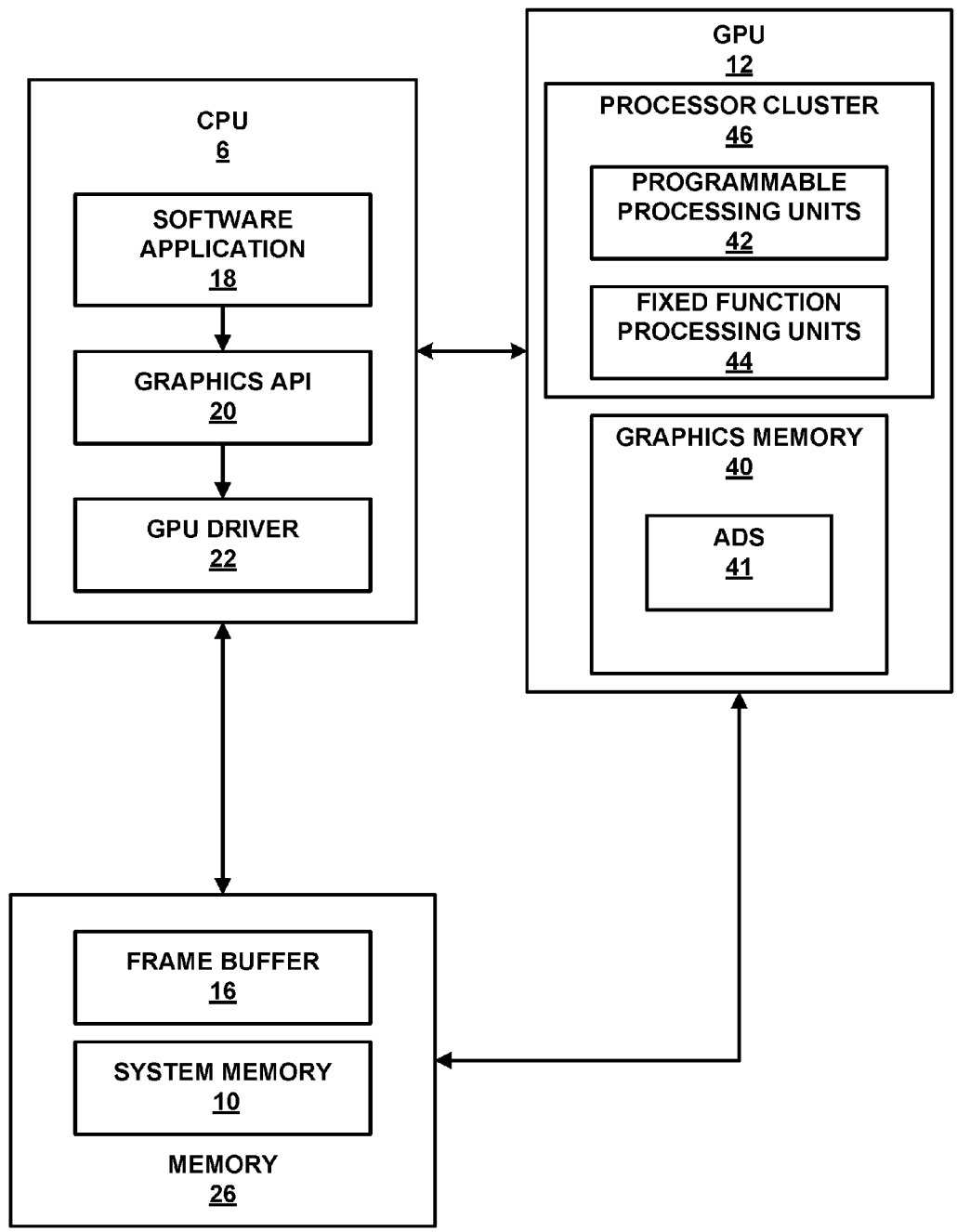
FIG. 2 is a block diagram illustrating example implementations of the CPU, the GPU, and the system memory of FIG. 1 in further detail.

FIG. 2 is a block diagram illustrating example implementations of CPU 6, GPU 12, and system memory 10 of FIG. 1 in further detail. As shown in FIG. 2, CPU 6 may include at least one software application 18, graphics API 20, and GPU driver 22, each of which may be one or more software applications or services that execute on CPU 6.

Memory available to CPU 6 and GPU 12 may include system memory 10 and frame buffer 16. Frame buffer 16 may be a part of system memory 10 or may be separate from system memory 10, and may store rendered image data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc.

The primitive definitions provided to GPU 12 may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by software application 18 to GPU driver 22, GPU driver 22 may formulate one or more commands that specify one or more operations for GPU 12 to perform in order to render the primitive. When GPU 12 receives a command from CPU 6, processor cluster 46 may execute a graphics processing pipeline to decode the command and may configure the graphics processing pipeline to perform the operation specified in the command. For example, a command engine of the graphics processing pipeline may read primitive data and assemble the data into primitives for use by the other graphics pipeline stages in the graphics processing pipeline. After performing the specified operations, GPU 12 outputs the rendered data to frame buffer 16 associated with a display device.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Frame buffer 16 may also store depth values for each destination pixel. In this way, frame buffer 16 may be said to store graphics data (e.g., a surface). Although frame buffer 16 and system memory 10 are illustrated as being separate memory units, in other examples, frame buffer 16 may be part of system memory 10. Once GPU 12 has rendered all of the pixels of a frame into frame buffer 16, frame buffer may output the finished frame to display 8 for display.

Processor cluster 46 may include one or more programmable processing units 42 and/or one or more fixed function processing units 44. Programmable processing unit 42 may include, for example, programmable shader units that are configured to execute one or more shader programs that are downloaded onto GPU 12 from CPU 6. In some examples, programmable processing units 42 may be referred to as "shader processors" or "unified shaders," and may perform geometry, vertex, pixel, or other shading operations to render graphics. The shader units may each include one or more components for fetching and decoding operations, one or more ALUs for carrying out arithmetic calculations, one or more memories, caches, and registers.

GPU 12 may designate programmable processing units 42 to perform a variety of shading operations such as vertex shading, hull shading, domain shading, geometry shading, fragment shading, and the like by sending commands to programmable processing units 42 to execute one or more of a vertex shader stage, tessellation stages, a geometry shader stage, a rasterization stage, and a fragment shader stage in the graphics processing pipeline. In some examples, GPU driver 22 may cause a compiler executing on CPU 6 to compile one or more shader programs, and to download the compiled shader programs onto programmable processing units 42 contained within GPU 12.

The shader programs may be written in a high level shading language, such as, e.g., an OpenGL Shading Language (GLSL), a High Level Shading Language (HLSL), a C for Graphics (Cg) shading language, an OpenCL C kernel, etc. The compiled shader programs may include one or more instructions that control the operation of programmable processing units 42 within GPU 12. For example, the shader programs may include vertex shader programs that may be executed by programmable processing units 42 to perform the functions of the vertex shader stage, tessellation shader programs that may be executed by programmable processing units 42 to perform the functions of the tessellation stages, geometry shader programs that may be executed by programmable processing units 42 to perform the functions of the geometry shader stage and/or fragment shader programs that may be executed by programmable processing units 42 to perform the functions of the fragment shader stage. A vertex shader program may control the execution of a programmable vertex shader unit or a unified shader unit, and include instructions that specify one or more per-vertex operations.

Processor cluster 46 may also include fixed function processing units 44. Fixed function processing units 44 may include hardware logic circuitry that is hard-wired to perform certain functions. Although fixed function processing units 44 may be configurable, via one or more control signals for example, to perform different functions, the fixed function hardware typically does not include a program memory that is capable of receiving user-compiled programs. In some examples, fixed function processing units 44 in processor cluster 46 may include, for example, processing units that perform raster operations, such as, e.g., depth testing, scissors testing, alpha blending, low resolution depth testing, etc., to perform the functions of the rasterization stage of the graphics processing pipeline.

Graphics memory 40 may be on-chip storage or memory that is physically integrated into the integrated circuit of GPU 12. Because graphics memory 40 is on-chip, GPU 12 may be able to read values from or write values to graphics memory 40 more quickly than reading values from or writing values to system memory 10 via a system bus.

In accordance with aspects of the present disclosure, processor cluster 46 may perform operations as discussed above to execute a graphics processing pipeline to render a three-dimensional (3D) graphics scene that includes one or more graphics objects within a model space or world space, including rendering a plurality of primitives that make up the one or more graphics objects in the 3D scene. Processor cluster 46 may also perform ray tracing of the 3D graphics scene by tracing a path of light from a light source through pixels of the 3D graphics scene, to determine which pixels of the 3D graphics scene are illuminated by the light source.

As part of performing ray tracing of the 3D graphics scene, processor cluster 46 may perform shadow rendering of the 3D graphics scene to determine surfaces of the 3D graphics scene that are not illuminated by the light source (and therefore are in shadows). Such surfaces may be in shadows because one or more other solid surfaces block light rays emitted by the light source from reaching those surfaces. To determine whether a particular location in the 3D graphics scene is shaded from the light source by a surface, processor cluster 46 may cast a vector called a shadow ray from the particular location in the direction of the light source. If processor cluster 46 determines that the shadow ray cast from the location intersects a primitive that is situated between the location and the light source, then processor cluster 46 may deem the location from which the shadow ray originates to be occluded from the light source.

To determine whether a particular shadow ray originating from a particular location of the 3D graphics scene and directed towards a light source for the 3D graphics scene intersects a primitive in the 3D graphics scene, GPU 12 may organize the primitives in the 3D graphics scene into a hierarchical structure, such as acceleration data structure (ADS) 41, that hierarchically groups scene primitives (e.g., triangles). GPU 12 may store ADS 41 in graphics memory 40, system memory 10, in shader memory (not shown) of processor cluster 46, or in shared system/graphics memory (not shown). Details of how GPU 12 uses ADS 41 to determine shadow ray-primitive intersections are discussed in further detail with respect to FIGS. 3 and 4.

Figure 3:
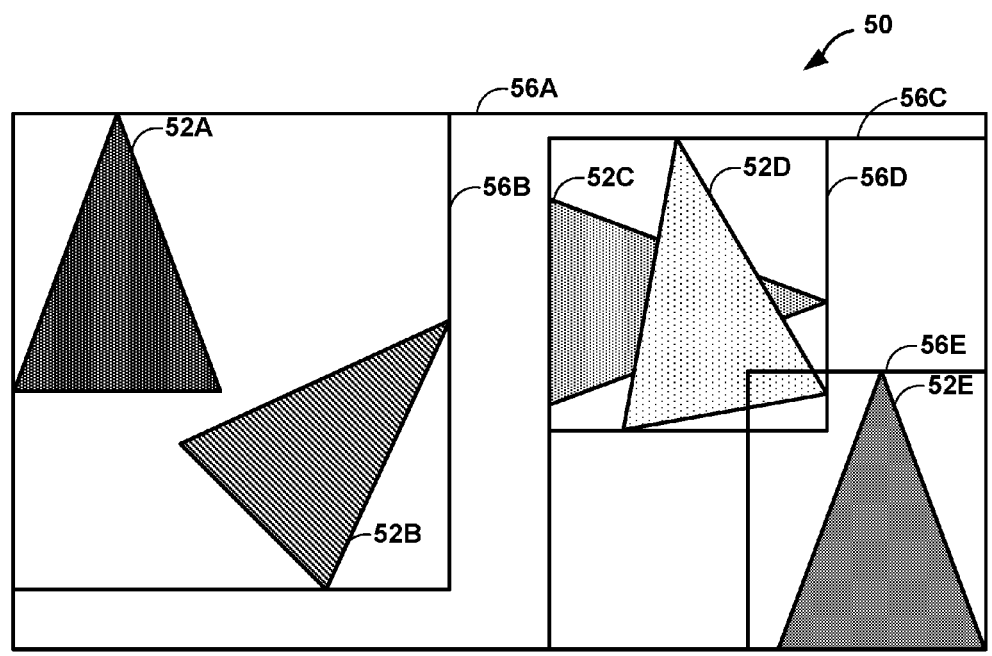
FIG. 3 is a conceptual diagram illustrating an example graphics scene onto which the GPU may perform shadow ray tracing and an example partitioning of the graphics scene into bounding volumes.

FIG. 3 is a conceptual diagram illustrating an example graphics scene onto which GPU 12 may perform shadow ray tracing and an example partitioning of the graphics scene into bounding volumes. As shown in FIG. 3, graphics scene 50 may be a 2D or 3D graphics scene that includes primitives 52A-52E (hereafter "primitives 52"). As part of the shadow mapping process, GPU 12 may determine, for a particular location in graphics scene 50, whether a shadow ray originating from the particular location towards a light source intersects one of primitives 52. If GPU 12 determines that the shadow ray intersects a primitive that is situated between the light source and the location from which the shadow ray originates, then the location from which the shadow ray originates is shadowed from the light source by the intersected primitive and is therefore not illuminated by the light source.

GPU 12 may systematically determine whether a primitive in primitives 52 intersects a particular shadow ray by dividing graphics scene 50, hierarchically arranging the divided portions of graphics scene 50, and recursively traversing the hierarchy of the divided portions of graphics scene 50. GPU 12 may conceptually partition primitives 52 into bounding volumes 56A-56E ("bounding volumes 56"). Bounding volumes 56 may be axis-aligned bounding boxes (AABBs), which may be bounding boxes having a minimized area within which all points of the enclosed primitives may lie. The bounding boxes may be axis-aligned such that the edges of the boxes may be parallel to the coordinate axis (e.g., the x, y, and z axis).

Bounding volume 56A may be a bounding box that bounds all primitives 52 of graphics scene 50. Bounding volumes 56B and 56C may be subsets of bounding volume 56A in that bounding volumes 56B and 56C bound a subset of the portion of scene 50 bound by bounding volume 56A. Bounding volume 56B may bind primitives 52A and 52B, and bounding volume 56C may bind primitives 52C, 52D, and 52E. Bounding volumes 56D and 56E may be subsets of bounding volume 56C, and may bind a subset of the portion of scene 50 bound by bounding volume 56B. Bounding volume 56D may bound primitives 52C and 52D, and bounding volume 56E may bound primitive 52E.

In the example shown in FIG. 3, GPU 12 may partition primitives 52 into five bounding volumes 56A-56E. GPU 12 is not limited to five bounding volumes 56A-56E but may, depending on the scene and the number of primitives in the scene, use more than or fewer than five bounding volumes 56A-56E. In some examples GPU 12 may create additional bounding volumes as subsets of bounding volume 56B to individually bound primitives 52A and 52B, respectively. In some examples, CPU 6 may also be configured to partition primitives 52 into bounding volumes 56.

Figure 4:
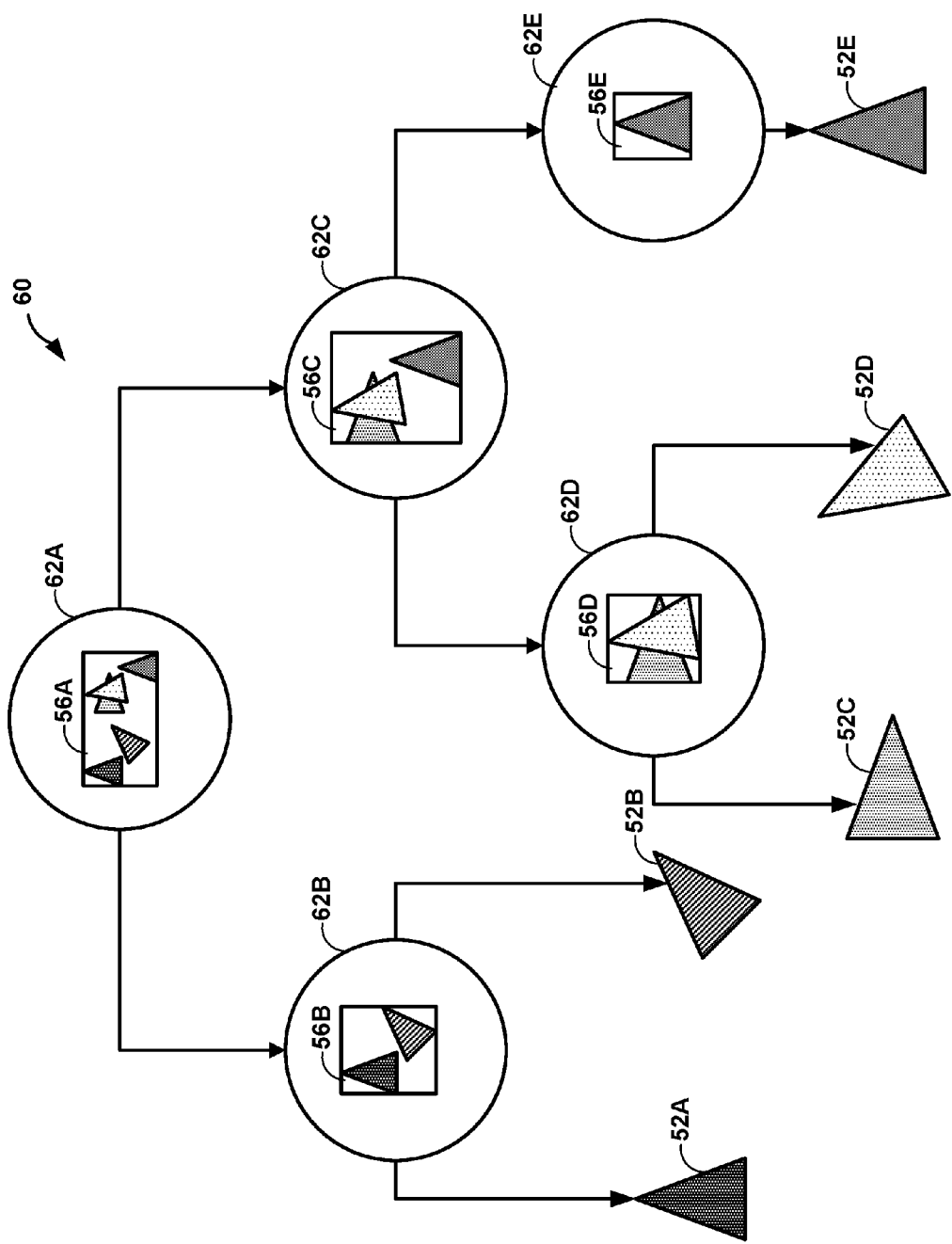
FIG. 4 illustrates an example hierarchical data structure having nodes that are associated with the example bounding volumes and primitives shown in FIG. 3.

Bounding volumes 56 may be arranged into a hierarchical structure such that GPU 12 may traverse the hierarchical structure to determine possible shadow ray-primitive intersections. FIG. 4 illustrates an example hierarchical data structure having nodes that are associated with the bounding volumes 56 and primitives 52 shown in FIG. 3. As discussed above, scene primitives of a scene may be organized into a hierarchical structure such as ADS 41, and GPU 12 may traverse ADS 41 to determine possible shadow ray-primitive intersections. As shown in FIG. 4, one example of ADS 41 may be a bounding volume hierarchy (BVH) tree 60 in which nodes 62A-62E ("nodes 62") of BVH tree 60 associated with bounding volumes 56 and primitives 52 of graphics scene 50 are hierarchically arranged into a tree-like structure.

Specifically, GPU 12 may arrange BVH tree 60 such that a node associated with a bounding volume that encloses another bounding volume may be a parent node of the node associated with the enclosed bounding volume. In the example of FIG. 3, because bounding volume 56C encloses bounding volumes 56D and 56E, which are subsets of bounding volume 56C, node 62C associated with bounding volume 56C may be a parent node of nodes 62D and 62E associated with bounding volumes 56D and 56E, respectively. Therefore, root node 62A may be associated with bounding volume 56, interior node 62C may be associated with bounding volume 56C, and leaf nodes 62B, 62D, and 62E may be associated with bounding volumes 56B, 56D, and 56E, respectively.

Nodes of BVH tree 60 other than root node 62A may be referred to as non-root nodes of BVH tree 60. For example, interior node 62C and leaf nodes 62B, 62D, and 62E may be referred to as non-root nodes of BVH tree 60. Leaf nodes 62B, 62D, and 62E may each be linked with at least one primitive of primitives 52. For example, leaf node 62B may be linked with primitives 52A and 52B because bounding volume 56B associated with leaf node 62D encloses primitives 52A and 52B, leaf node 62D may be linked with primitives 52C and 52D because bounding volume 56D associated with leaf node 62D encloses primitives 52C and 52D, and leaf node 62E may be linked with primitive 52E because bounding volume 56E associated with leaf node 62E encloses primitive 52E. BVH tree 60 may be considered an unbalanced binary tree because each non-leaf node of hierarchical data structure 60 has at most two child nodes, and because leaf nodes 62B, 62D, and 62E may have unequal depths.

GPU 12 may traverse BVH tree 60 to determine whether a shadow ray intersects a primitive of primitive 52 by performing ray-box intersection tests for the bounding volumes 56 associated with nodes 62 of BVH tree 60. GPU 12 may start traversal of BVH tree 60 by performing a ray-box intersection test for bounding volume 56A associated with root node 62A. If GPU 12 determines that the shadow ray intersects bounded volume 56A, GPU 12 may continue to traverse BVH tree 60 to node 62B, and GPU 12 may perform a ray-box intersection test for bounding volume 56B associated with node 62B.

If GPU 12 determines that the shadow ray does not intersect bounded volume 56B, GPU 12 may recursively traverse BVH tree up to node 62A and down to node 62C, and GPU 12 may perform a ray-box intersection test for bounding volume 56C associated with node 62C. If GPU 12 determines that the shadow ray intersects bounded volume 56C, GPU 12 may continue to traverse BVH tree 60 to node 62D, and GPU 12 may perform a ray-box intersection test for bounding volume 56D associated with node 62D. If GPU determines that the shadow ray intersects bounded volume 56D, GPU 12 may perform a ray-primitive intersection tests for primitives linked to node 62D.

Therefore, GPU 12 may perform a ray-primitive intersection test for primitive 52C and may also perform a ray-primitive intersection test for primitive 52D to determine whether the shadow ray intersects primitive 52C or primitive 52D. GPU 12 may determine from the ray-primitive intersection test for primitive 52D that the shadow ray does intersect primitive 52D. Upon determining that the shadow ray does intersect a primitive (e.g., primitive 52D), GPU 12 may determine the location in graphics scene 50 from which the shadow ray originates is occluded from the light source.

If GPU 12 determines that the shadow ray does not intersect primitive 52D, GPU 12 may continue to recursively traverse BVH tree 60 up to node 62C and down to 62E, and GPU 12 may perform a ray-box intersection test for bounding volume 56E associated with node 62E. GPU 12 may determine, based on the ray-box intersection test, whether the shadow ray intersects bounding volume 56E and, upon making the determination, may end traversal of BVH tree 60 for the shadow ray.

If BVH tree 60 can be traversed starting from a non-root node, such as one of interior node 62C or leaf nodes 62B, 62D, and 62E, GPU 12 may reduce the number of ray intersection tests that it performs relative to starting traversal of BVH tree 60 from root node 62A, thereby increasing the efficiency of determining a primitive that is intersected by a ray. GPU 12 may start traversal of BVH tree 60 from a non-root node of BVH tree 60 by determining that a bounded volume associated with a non-root (interior) node of BVH tree 60 is intersected by the particular shadow ray. GPU 12 may rasterize at least a subset of bounded volumes 56 to an off-screen render target in graphics memory 40. GPU 12 may determine, based on rasterizing the plurality of bounding volumes 56 to the off-screen render target, a non-root node of BVH tree 60 as a start node in BVH tree 60 to start traversal of BVH tree 60. GPU 12 may traverse BVH tree 60 starting from the start node to determine the primitive that is intersected by ray 54.

To perform shadow rendering of a graphics scene, such as graphics scene 50, using shadow rays, GPU 12 may render a representation of at least a portion of bounding volumes 56 of BVH tree 60 from the perspective of a light source for graphics scene 50. When representations of at least a portion of bounding volumes 56 are rendered from the perspective of the light source, GPU 12 can determine that locations in graphics scene 50 are not illuminated by the light source if shadow rays that originate from those locations intersect a primitive of primitives 52.

As discussed above, GPU 12 may traverse a hierarchical structure, such as BVH tree 60, to determine whether a shadow ray originating from a particular location within graphics scene 50 intersects with a primitive of primitives 52. If GPU 12 determines, via traversal of BVH tree 60, that the shadow ray intersects with a primitive of primitive 52, GPU 12 may determine that the particular location within graphics scene 50 from which the shadow ray originates is not illuminated by the light source for graphics scene 50. GPU 12 may typically traverse BVH tree 60 from root node 62A by performing ray-box intersection tests between the shadow ray and bounding volumes 56 associated with nodes 52 and/or ray-intersection tests between the shadow ray and primitives 52 to determine whether the particular location is illuminated by the light source for scene 50.

However, BVH trees can be many multiple levels deep. For example, if a BVH tree includes 16 levels, GPU 12 may be able to more efficiently determine whether a shadow ray intersects a primitive by starting traversal of the BVH tree from a non-root node of the BVH tree instead of starting from the root of the BVH tree. Because GPU 12 may use pixel shader programs and/or vertex shader programs running on processor cluster 46 to quickly rasterize pixels to an off-screen render target and to quickly sample pixels in the off-screen render target, GPU 12 may take advantage of the performance characteristics of these shader programs to determine non-root nodes from which to start traversal of a BVH tree.

Figure 5:
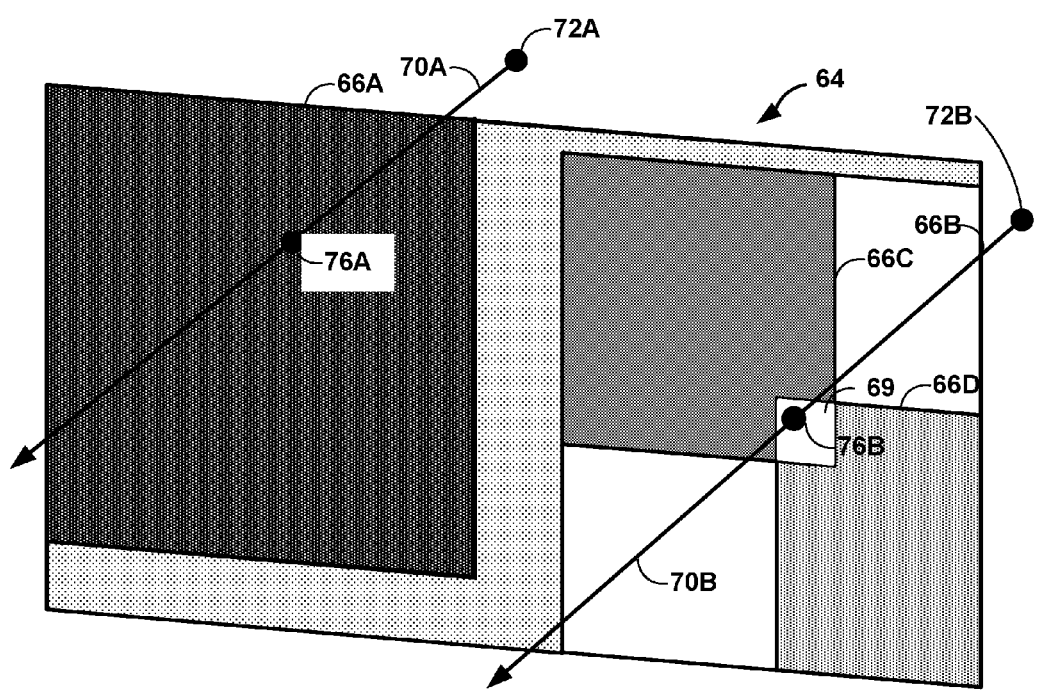
FIG. 5 is a block diagram illustrating an example representation of bounding volumes rasterized to an example off-screen render target.

FIG. 5 is a block diagram illustrating an example representation of bounding volumes rasterized to an example off-screen render target. GPU 12 may, for a specified number of top levels of a BVH tree, use a pixel shader and/or a vertex shader of its graphics processing pipeline executing on processor cluster 46 to rasterize representations of bounding volumes associated with the nodes of a BVH tree to an off-screen render target in graphics memory or system memory 10 from a light source's point of view. GPU 12 may transform the representations of bounding volumes with a projection matrix such that GPU 12 rasterizes the representations of bounding volumes from a particular light source of graphics scene 50's point of view.

If graphics scene 50 includes multiple light sources, GPU 12 may perform such a rasterization of representations of bounding volumes to the off-screen render target multiple times, once for each light source. GPU 12 may perform such rasterization with a different projection matrix for each light source, such that representations of bounding volumes are rasterizes from the point of view of each light source.

In some examples, GPU 12 may rasterize only specified top levels of the BVH tree to the off-screen render target, such that given a 16-level BVH tree, GPU 12 may rasterize a representation of bounding volumes associated with only the top, e.g., 5-6, levels of the BVH tree. Thus, GPU 12 may, in some examples, rasterize representations of bounding volumes associated with fewer than all of the non-root nodes of the BVH tree to off-screen render target 64.

As shown in FIG. 5, GPU 12 may rasterize representations 66A-66D ("representations 66") of bounding volumes 56B-56E of graphics scene 50 associated with nodes 62B-62E of BVH tree 60 to off-screen render target 64 from the perspective of a light source for graphics scene 50. GPU 12 may rasterize representations 66 with a perspective matrix. GPU 12 may store off-screen render target 64 in graphics memory 40, system memory 10, or any other suitable memory.

GPU 12 may project bounding volumes 56B-56E and shader units of processor cluster 46 of GPU 12 may rasterize representations of bounding volumes 56B-56E associated with the non-root nodes 62B-62E of BVH tree 60 as two-dimensional or three-dimensional representations, such as polygons, cubes, and the like. For example, a hardware rasterizer of GPU 12 may scan-covert each of bounding volumes 56 into pixels in render target 64. In one example, GPU 12 may rasterize a plurality of flat shaded cubes to off-screen render target 64 as representations 66 of bounding volumes 56B-56E. GPU 12 may also scale and translate each of the representations 66 via a perspective matrix such that representations 66 are rasterized from a light source's point of view. In some examples, GPU 12 may rasterize representations 66 of bounding volumes 56B-56E in relatively lower resolution compared to bounding volumes 56B-56E in graphics scene 50. In this way, GPU 12 may further increase its performance in determining ray-primitive intersections.

GPU 12 may associate a different color value with each of the nodes 62 of BVH tree 60, and may, for each bounding volume of bounding volumes 56, rasterize, as the associated representation of the bounding volume of representations 66, a block of pixels having a color value associated with a node of BVH tree 60 that is associated with the respective bounding volume. In this way, GPU 12 may rasterize each of the representations 66 of bounding volumes 56B-56E in a different color, so that the color of each of the representations 66 may represent a node index that indicates the associated node in BVH tree 60.

GPU 12 may determine the color of the representations 66 by performing standard depth testing of the projected bounding volumes 56B-56E and by assigning different color values to pixels of representations 66 to represent different depths of the projected bounding volumes 56B-56E. GPU 12 may associate the color values assigned to the pixels of representations 66 with nodes 62 of BVH tree 60. In this way, GPU 12 may determine a node in BVH tree 60 associated with a pixel in render target 64 by sampling the color value of the pixel. As part of rasterizing representations 66 to render target 64, GPU 12 may determine a mapping of shadow rays to pixels in render target 64, so that, for a pixel in render target 64, GPU 12 may map it as possibly intersecting one or more shadow rays, such as shadow ray 70A that originates from location 72A or shadow ray 70B that originates from position 72B. In some examples, render target 64 may have a one-to-one mapping between a pixel and a shadow ray. In other examples, if representations 66 are rasterized at a relatively lower resolution (compared to the resolution of corresponding bounding volumes 56) to render target 64, a pixel may be mapped to multiple shadow rays.

To determine potential shadow ray-primitive intersections for a particular shadow ray that originates from a particular location in a graphics scene, GPU 12 may, for each ray, determine a pixel location in render target 64 that map to the shadow ray. Given a shadow ray having an origin and a direction, GPU 12 may, based on the light source's projection matrix, map the shadow ray to a pixel location in render target 64. For that pixel location, GPU 12 may sample the color value of the pixel and determine the node associated with the sampled color value as the start node to start traversal of BVH tree 60.

In the example of FIG. 5, GPU 12 may determine that pixel 76A is a pixel in render target 64 that is mapped to shadow ray 70A. GPU 12 may sample pixel 76A in render target 64 to determine the color value of pixel 76A, determine that the sampled color value of pixel 76A is the same as the color value associated with a node index for node 62B, and may thereby associate that pixel 76A with node 62B. Thus, GPU 12 may set node 62B as the start node for traversing BVH tree 60 and may start traversal of BVH tree 60 from node 62B.

As GPU 12 traverses BVH tree 60 starting from node 62B, GPU 12 may first perform a shadow ray-box intersection test for bounding volume 56B associated with node 62B. If GPU 12 determines that shadow ray 70A intersects bounded volume 56B, GPU 12 may perform a ray-primitive intersection test for primitive 52A that is linked to node 62D. If GPU 12 determines that shadow ray 70A does not intersect primitive 52A, GPU 12 may recursively traverse BVH tree 60 up to node 62B and may perform a ray-primitive intersection test for primitive 52B linked to node 62B. GPU 12 may determine from the ray-primitive intersection test for primitive 52B that shadow ray 70A does not intersect primitive 52B. Because GPU 12 starts traversal of BVH tree 60 from interior node 62B and determines shadow ray 70A does not intersect with either primitives 52A or 52B, GPU 12 may end the traversal of BVH tree 60 for shadow ray 70A. GPU 12 may therefore determine that location 72A is the location from which shadow ray 70A is illuminated by the light source (and not occluded from the light source) for graphics scene 50 because shadow ray 70A does not intersect any primitives in scene 50. As can be seen, the traversal of BVH tree 60 to determine whether a primitive intersects shadow ray 70A may include performing relatively fewer ray-box intersection tests as opposed to the case in which GPU 12 is required to traverse BVH tree 60 starting from the root node.

In some examples, depending on the viewing angle, representations of bounding volumes of any two nodes may overlap when projected on screen. In this case the traversal of BVH tree 60 may start from the lowest common ancestor of the two overlapping bounding volumes, which may not be the root node. If two representations of bounding volumes overlap, and if a ray intersects in the overlapped region of the two bounding volumes, GPU 12 may determine the lowest common ancestor node of the nodes associated with the bounding volumes and may start traversal of BVH tree 60 from the lowest common ancestor node of the nodes associated with the bounding volumes represented by the two overlapping representations. For example, while rasterizing representations 66 to render target 64, GPU 12 may determine that representation 66C and representation 66D overlap in area 69, where representation 66C is associated with node 62D and representation 66D is associated with node 62E, and where node 62D and node 62E are at the same level in BVH tree 60. GPU 12 may determine the color value associated with the lowest common ancestor node of nodes 62D and 62E and may set the color value of the pixels in area 69 (i.e., the region of overlap) to the same color value associated with the lowest common ancestor node of nodes 62D and 62E. In this example, GPU 12 may determine that node 62C is the lowest common ancestor node of nodes 62D and 62E and may set the color value of the pixels in area 69 to the color value of representation 66B that is associated with node 62C. If a particular ray maps to a pixel location within area 69, GPU may start traversal of BVH tree 60 from node 62C, and not root node 62A, to determine any possible ray-primitive intersections.

For example, if GPU 12 determines that shadow ray 70A emanating from location 72B maps to pixel 76B that lies within area 69, GPU 12 may determine to start traversal of BVH tree 60 from the node 62C, which is not root node 62A, by sampling the color of mapped pixel 76B and determining that the color value of the sample pixel is the same as the color value associated with node 62C. Because node 62C is associated with bounding volume 56C represented by representation 66B in render target 64, GPU 12 may perform a ray-box intersection test for bounding volume 56C associated with node 62C.

If GPU 12 determines that shadow ray 70B intersects bounded volume 56C, GPU 12 may traverse BVH tree 60 to node 62D. GPU 12 may perform a ray-box intersection test for bounding volume 56D associated with node 62D. If GPU determines that shadow ray 70B intersects bounded volume 56D, GPU 12 may perform a ray-primitive intersection test for primitive 52C linked to node 62D. If GPU determines that shadow ray 70B does not intersect primitive 52C, GPU 12 may recursively traverse BVH tree 60 up to node 62D and may perform a ray-primitive intersection test for primitive 52D linked to node 62D. GPU 12 may determine from the ray-primitive intersection test for primitive 52D that shadow ray 70B does intersect primitive 52D.

When GPU 12 determines that shadow ray 70B intersects one of primitives 52, GPU 12 may determine that location 72B from which shadow ray 70B is occluded from (not illuminated by) the light source of graphics scene 50 and may end the traversal of BVH tree 60 for shadow ray 70B. As can be seen, GPU 12 may accelerate the traversal of BVH tree 60 by rendering a representation of graphics scene 50 into render target 64, and sampling pixels from render target 64 to determine a non-root node from which to begin traversal of BVH tree 60.

Figure 6:
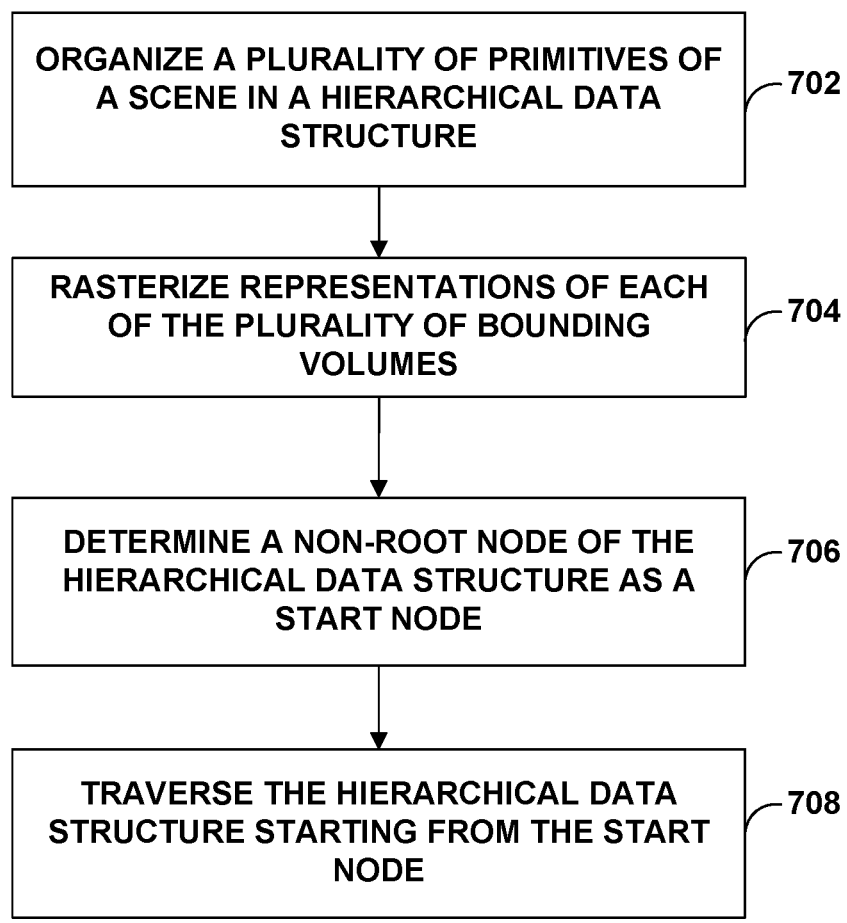
FIG. 6 is a flowchart illustrating an example process for determining the start node for traversing an example hierarchical tree structure to find a shadow ray-primitive intersection.

FIG. 6 is a flowchart illustrating an example process for determining the start node for traversing an example hierarchical tree structure to find a shadow ray-primitive intersection. As shown in FIG. 6, the process may include organizing, by at least one processor, such as CPU 6 or GPU 12, a plurality of primitives 52 of a graphics scene (e.g., graphics scene 50) in a hierarchical data structure (e.g., BVH tree 60), wherein a plurality of bounding volumes 56 are associated nodes 62 of the hierarchical data structure (702). The process may further include rasterizing, by CPU 6 or GPU 12, representations of each of the plurality of bounding volumes 56 to an off-screen render target 64 (704). The process may further include determining, by CPU 6 or GPU 12 and based at least in part on a pixel in the off-screen render target 64 that maps to a ray in the graphics scene 50, a non-root node of the hierarchical data structure associated with the pixel as a start node to start traversal of the hierarchical data structure (706). The process may further include traversing, by CPU 6 or GPU 12, a set of nodes of the hierarchical data structure starting from the start node to determine whether the ray in the graphics scene 50 intersects one of the plurality of primitives 52 (718).

The at least one processor may perform shadow rendering for a plurality of locations in graphics scene 50 by emanating a shadow ray from each of the plurality of locations, and determining possible shadow ray-primitive intersections for each of the shadow rays according to the above-mentioned process. If the at least one processor determines that a particular location in graphics scene 50 is occluded from the light source because the shadow ray emanating from the particular location intersects a primitive in graphics scene 50, the at least one processor may modify the pixel values of that particular location. For example, the at least one processor may modify the color values of the particular location to a black color value or another suitable color value that indicates the particular location is occluded from the light source.

Further, by rasterizing representations of each of the plurality of bounding volumes 56 to an off-screen render target 64, and determining a non-root node of the hierarchical data structure from which to start traversal of the hierarchical data structure based on the pixel in the off-screen render target 64 that maps to the shadow ray, the process provides a technological solution to an underlying technological problem in graphics processing of how to more efficiently traverse a hierarchical data structure by determining a non-root start node, thereby enabling the at least one processor to more efficiently perform shadow rendering for a scene.

In some examples, rasterizing the representation of each of the plurality of bounding volumes 56 to the off-screen render target 64 may further include associating, by CPU 6 or GPU 12, a different one of a plurality of color values with each of the plurality of nodes 62 of the hierarchical data structure, and for each bounding volume of the plurality of bounding volumes 56, rasterizing, by CPU 6 or GPU 12, a block of pixels having one of the different color values associated with one of the nodes of the hierarchical data structure that is associated with the respective bounding volume.

In some examples, determining the non-root node of the hierarchical data structure associated with the pixel as the start node to start traversal of the hierarchical data structure may further include determining, by CPU 6 or GPU 12, a node of the hierarchical data structure that is associated with a pixel color value of the pixel, and setting, by CPU 6 or GPU 12, the node of the hierarchical data structure that is associated with the pixel color value as the start node to start traversal of the hierarchical data structure.

In some examples, the process may further include determining, with CPU 6 or GPU 12, that a first representation of a first bounding volume of the bounding volumes overlaps a second representation of a second bounding volume of the bounding volumes, wherein the first bounding volume is associated with a first node of the hierarchical data structure and the second bounding volume is associated with a second node of the hierarchical data structure, and setting, by CPU 6 or GPU 12, color values of one or more pixels in a region of overlap of the first representation and the second representation to a node color value associated with a lowest common ancestor node of the first node and the second node.

In some examples, the process may further include, responsive to determining that the ray intersects one of the plurality of primitives 52, determining, by CPU 6 or GPU 12, that a location in the graphics scene 50 from which the ray emanates towards a light source is occluded from the light source, where the ray comprises a shadow ray. In some examples, rasterizing the representation of each of the plurality of bounding volumes 56 to the off-screen render target 64 may further include rasterizing, by CPU 6 or GPU 12, representations of the plurality of bounding volumes 56 associated with fewer than all of the non-root nodes of the hierarchical data structure to the off-screen render target 64.

In some examples, rasterizing the representation of each of the plurality of bounding volumes 56 to the off-screen render target 64 may further include rasterizing, by CPU 6 or GPU 12, a plurality of flat-shaded cubes to the off-screen render target 64 as the representations of each of the plurality of bounding volumes 56, and scaling and translating, by CPU 6 or GPU 12, each of the plurality of flat-shaded cubes to match a shape of a respective bounding volume. In some examples, the process may further include rendering the scene for display by a display device.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

The invention claimed is:

1. A method comprising:
   organizing, by at least one processor, a plurality of primitives of a scene in a hierarchical data structure, wherein a plurality of bounding volumes are associated with nodes of the hierarchical data structure;
   rasterizing, by the at least one processor, representations of each of the plurality of bounding volumes to an off-screen render target, wherein each representation of the representations of each of the plurality of bounding volumes is associated with a different color value of a plurality of color values;
   determining, by the at least one processor and based at least in part on a color value of the plurality of color values of a pixel of a representation of a respective one of the bounding volumes in the off-screen render target that maps to a ray, a non-root node of the hierarchical data structure associated with the respective one of the bounding volumes as a start node to start traversal of the hierarchical data structure; and
   traversing, by the at least one processor, a set of nodes of the hierarchical data structure starting from the start node to determine whether the ray in the scene intersects one of the plurality of primitives.

2. The method of claim 1, wherein rasterizing the representation of each of the plurality of bounding volumes to the off-screen render target further comprises:
   associating, by the at least one processor, a different one of a plurality of color values with each of the plurality of nodes of the hierarchical data structure; and
   for each bounding volume of the plurality of bounding volumes, rasterizing, by the at least one processor, a block of pixels having one of the different color values associated with one of the nodes of the hierarchical data structure that is associated with the respective bounding volume.

3. The method of claim 2, wherein determining the non-root node of the hierarchical data structure associated with the bounding volume as the start node to start traversal of the hierarchical data structure further comprises:
   determining, by the at least one processor, one of the nodes of the hierarchical data structure that is associated with the color value of the pixel; and
   setting, by the at least one processor, the node of the hierarchical data structure that is associated with the color value of the pixel as the start node to start traversal of the hierarchical data structure.

4. The method of claim 2, further comprising:
   determining, by the at least one processor, that a first representation of a first bounding volume of the bounding volumes overlaps a second representation of a second bounding volume of the bounding volumes, wherein the first bounding volume is associated with a first node of the nodes of the hierarchical data structure and the second bounding volume is associated with a second node of the nodes of the hierarchical data structure; and
   setting, by the at least one processor, color values of one or more pixels in a region of overlap of the first representation and the second representation to a node color value associated with a lowest common ancestor node of the first node and the second node.

5. The method of claim 1, further comprising:
   responsive to determining that the ray intersects one of the plurality of primitives, determining, by the at least one processor, that a location in the scene from which the ray emanates towards a light source is occluded from the light source, wherein the ray comprises a shadow ray.

6. The method of claim 1, wherein rasterizing the representation of each of the plurality of bounding volumes to the off-screen render target further comprises:
   rasterizing, by the at least one processor, the representation of each of the plurality of bounding volumes to the off-screen render target from a point of view of a light source.

7. The method of claim 1, wherein rasterizing the representation of each of the plurality of bounding volumes to the off-screen render target further comprises:
   rasterizing, by the at least one processor, a plurality of flat-shaded cubes to the off-screen render target as the representations of each of the plurality of bounding volumes; and
   scaling and translating, by the at least one processor, each of the plurality of flat-shaded cubes to match a shape of a respective bounding volume.

8. The method of claim 1, further comprising:
   rendering, by the at least one processor, the scene for display by a display device.

9. An apparatus configured to process graphics data comprising:
   a memory; and
   at least one processor configured to:
      organize a plurality of primitives of a scene in a hierarchical data structure, wherein a plurality of bounding volumes are associated with nodes of the hierarchical data structure;
      rasterize representations of each of the plurality of bounding volumes to an off-screen render target in the memory, wherein each representation of the representations of each of the plurality of bounding volumes is associated with a different color value of a plurality of color values;
      determine, based at least in part on a color value of the plurality of color values of a pixel of a representation of a respective one of the bounding volumes in the off-screen render target that maps to a ray in the scene, a non-root node of the hierarchical data structure associated with the respective one of the bounding volumes as a start node to start traversal of the hierarchical data structure; and
      traverse a set of nodes of the hierarchical data structure starting from the start node to determine whether the ray in the scene intersects one of the plurality of primitives.

10. The apparatus of claim 9, wherein the at least one processor is further configured to:
    associate a different one of a plurality of color values with each of the plurality of nodes of the hierarchical data structure; and
    for each bounding volume of the plurality of bounding volumes, rasterize a block of pixels having one of the different color values associated with one of the nodes of the hierarchical data structure that is associated with the respective bounding volume.

11. The apparatus of claim 10, wherein the at least one processor is further configured to:
    determine one of the nodes of the hierarchical data structure that is associated with the color value of the pixel; and
    set the node of the hierarchical data structure that is associated with the color value of the pixel as the start node to start traversal of the hierarchical data structure.

12. The apparatus of claim 10, wherein the at least one processor is further configured to:
 determine that a first representation of a first bounding volume of the bounding volumes overlaps a second representation of a second bounding volume of the bounding volumes, wherein the first bounding volume is associated with a first node of the nodes of the hierarchical data structure and the second bounding volume is associated with a second node of the nodes of the hierarchical data structure; and
 set color values of one or more pixels in a region of overlap of the first representation and the second representation to a node color value associated with a lowest common ancestor node of the first node and the second node.

13. The apparatus of claim 9, wherein the at least one processor is further configured to:
 responsive to determining that the ray intersects one of the plurality of primitives, determine that a location in the scene from which the ray emanates towards a light source is occluded from the light source, wherein the ray comprises a shadow ray.

14. The apparatus of claim 9, wherein the at least one processor is further configured to:
 rasterize the representation of each of the plurality of bounding volumes to the off-screen render target from a point of view of a light source.

15. The apparatus of claim 9, wherein the at least one processor is further configured to:
 rasterize a plurality of flat-shaded cubes to the off-screen render target as the representations of each of the plurality of bounding volumes; and
 scale and translate each of the plurality of flat-shaded cubes to match a shape of a respective bounding volume.

16. The apparatus of claim 9, wherein the apparatus further includes a display device, and wherein the at least one processor is further configured to:
 render the scene for display by the display device.

17. An apparatus comprising:
 means for organizing a plurality of primitives of a scene in a hierarchical data structure, wherein a plurality of bounding volumes are associated with nodes of the hierarchical data structure;
 means for rasterizing representations of each of the plurality of bounding volumes to an off-screen render target, wherein each representation of the representations of each of the plurality of bounding volumes is associated with a different color value of a plurality of color values;
 means for determining, based at least in part on a color value of the plurality of color values of a pixel of a representation of a respective one of the bounding volumes in the off-screen render target maps to a ray in the scene, a non-root node of the hierarchical data structure associated with the respective one of the bounding volumes as a start node to start traversal of the hierarchical data structure; and
 means for traversing a set of nodes of the hierarchical data structure starting from the start node to determine whether the ray in the scene intersects one of the plurality of primitives.

18. The apparatus of claim 17, wherein the means for rasterizing the representation of each of the plurality of bounding volumes to the off-screen render target further comprises:
 means for associating a different one of a plurality of color values with each of the plurality of nodes of the hierarchical data structure; and
 means for rasterizing, for each bounding volume of the plurality of bounding volumes, a block of pixels having one of the different color values associated with one of the nodes of the hierarchical data structure that is associated with the respective bounding volume.

19. The apparatus of claim 18, wherein the means for determining the non-root node of the hierarchical data structure associated with the bounding volume as the start node to start traversal of the hierarchical data structure further comprises:
 means for determining one of the nodes of the hierarchical data structure that is associated with the color value of the pixel; and
 means for setting the node of the hierarchical data structure that is associated with the color value of the pixel as the start node to start traversal of the hierarchical data structure.

20. The apparatus of claim 18, further comprising:
 means for determining that a first representation of a first bounding volume of the bounding volumes overlaps a second representation of a second bounding volume of the bounding volumes, wherein the first bounding volume is associated with a first node of the nodes of the hierarchical data structure and the second bounding volume is associated with a second node of the nodes of the hierarchical data structure; and
 means for setting color values of one or more pixels in a region of overlap of the first representation and the second representation to a node color value associated with a lowest common ancestor node of the first node and the second node.

21. The apparatus of claim 17, further comprising:
 means for determining, responsive to determining that the ray intersects one of the plurality of primitives, that a location in the scene from which the ray emanates towards a light source is occluded from the light source, wherein the ray comprises a shadow ray.

22. The apparatus of claim 17, wherein the means for rasterizing the representation of each of the plurality of bounding volumes to the off-screen render target further comprises:
 means for rasterizing the representation of each of the plurality of bounding volumes to the off-screen render target from a point of view of a light source.

23. The apparatus of claim 17, wherein the means for rasterizing the representation of each of the plurality of bounding volumes to the off-screen render target further comprises:
 means for rasterizing a plurality of flat-shaded cubes to the off-screen render target as the representations of each of the plurality of bounding volumes; and
 means for scaling and translating each of the plurality of flat-shaded cubes to match a shape of a respective bounding volume.

24. A non-transitory computer-readable storage medium storing instructions that, when executed, cause one or more programmable processors to:
 organize a plurality of primitives of a scene in a hierarchical data structure, wherein a plurality of bounding volumes are associated with nodes of the hierarchical data structure;
 rasterize representations of each of the plurality of bounding volumes to an off-screen render target in the memory, wherein each representation of the representations of each of the plurality of bounding volumes is associated with a different color value of a plurality of color values;

determine, based at least in part on a color value of the plurality of color values of a pixel of a representation of a respective one of the bounding volumes in the off-screen render target maps to a ray in the scene, a non-root node of the hierarchical data structure associated with the respective one of the bounding volume as a start node to start traversal of the hierarchical data structure; and traverse a set of nodes of the hierarchical data structure starting from the start node to determine whether the ray in the scene intersects one of the plurality of primitives.

25. The non-transitory computer-readable storage medium of claim 24, wherein rasterize the representation of each of the plurality of bounding volumes to the off-screen render target further comprises:

associate a different one of a plurality of color values with each of the plurality of nodes of the hierarchical data structure; and for each bounding volume of the plurality of bounding volumes, rasterize a block of pixels having one of the different color values associated with one of the nodes of the hierarchical data structure that is associated with the respective bounding volume.

26. The non-transitory computer-readable storage medium of claim 25, wherein determine the non-root node of the hierarchical data structure associated with the bounding volume as the start node to start traversal of the hierarchical data structure further comprises:

determine one of the nodes of the hierarchical data structure that is associated with a color value of the pixel; and set the node of the hierarchical data structure that is associated with the color value of the pixel as the start node to start traversal of the hierarchical data structure.

27. The non-transitory computer-readable storage medium of claim 25, further comprising instructions that, when executed, cause one or more programmable processors to:

determine that a first representation of a first bounding volume of the bounding volumes overlaps a second representation of a second bounding volume of the bounding volumes, wherein the first bounding volume is associated with a first node of the nodes of the hierarchical data structure and the second bounding volume is associated with a second node of the nodes of the hierarchical data structure; and set color values of pixels in a region of overlap of the first representation and the second representation to the node color value associated with a lowest common ancestor node of the first node and the second node.

28. The non-transitory computer-readable storage medium of claim 24, further comprising instructions that, when executed, cause one or more programmable processors to:

responsive to determining that the ray intersects one of the plurality of primitives, determine that a location in the scene from which the ray emanates towards a light source is occluded from the light source, wherein the ray comprises a shadow ray.

29. The non-transitory computer-readable storage medium of claim 24, wherein rasterize the representation of each of the plurality of bounding volumes to the off-screen render target further comprises:

rasterize the representation of each of the plurality of bounding volumes to the off-screen render target from a point of view of a light source.

30. The non-transitory computer-readable storage medium of claim 24, wherein rasterize the representation of each of the plurality of bounding volumes to the off-screen render target further comprises:

rasterize a plurality of flat-shaded cubes to the off-screen render target as the representations of each of the plurality of bounding volumes; and scale and translate each of the plurality of flat-shaded cubes to match a shape of a respective bounding volume.

* * * * *